United States Patent
Varadarajan et al.

(10) Patent No.: US 11,553,060 B2
(45) Date of Patent: Jan. 10, 2023

(54) PROGRAMMABLE DELIVERY NETWORK

(71) Applicant: Zycada Networks, Campbell, CA (US)

(72) Inventors: Subramanian Varadarajan, Los Gatos, CA (US); Rosarin Roy Antonyraj, Sunnyvale, CA (US)

(73) Assignee: ZYCADA NETWORKS, Campbell, CA (US)

( * ) Notice: Subject to any disclaimer, the term of this patent is extended or adjusted under 35 U.S.C. 154(b) by 127 days.

(21) Appl. No.: 17/192,593

(22) Filed: Mar. 4, 2021

(65) Prior Publication Data

US 2021/0194982 A1   Jun. 24, 2021

Related U.S. Application Data

(63) Continuation of application No. 16/925,189, filed on Jul. 9, 2020, now Pat. No. 10,972,572.

(60) Provisional application No. 62/873,637, filed on Jul. 12, 2019.

(51) Int. Cl.
| | |
|---|---|
| H04L 67/568 | (2022.01) |
| H04L 67/01 | (2022.01) |
| H04L 67/63 | (2022.01) |
| H04L 67/1001 | (2022.01) |

(52) U.S. Cl.
CPC ............ *H04L 67/568* (2022.05); *H04L 67/01* (2022.05); *H04L 67/1001* (2022.05); *H04L 67/63* (2022.05)

(58) Field of Classification Search
None
See application file for complete search history.

(56) References Cited

U.S. PATENT DOCUMENTS

| | | |
|---|---|---|
| 9,992,260 B1 | 6/2018 | McMullen et al. |
| 10,834,171 B2 | 11/2020 | McMullen et al. |
| 2013/0166634 A1 | 6/2013 | Holland |
| 2014/0372963 A1* | 12/2014 | Chandaria ............... G06F 8/00 717/100 |

(Continued)

OTHER PUBLICATIONS

Varadarajan, Notice of Allowance, U.S. Appl. No. 16/925,189, dated Dec. 23, 2020, 7 pgs.

(Continued)

*Primary Examiner* — Jeffrey R Swearingen
(74) *Attorney, Agent, or Firm* — Morgan, Lewis & Bockius LLP

(57) ABSTRACT

A system and method are provided for provisioning code snippets for programming a content delivery network. The method includes receiving a first client code snippet from a first client. The first client code snippet includes identity information of origin servers, standard responses for network requests, and configuration parameters to configure programmable content delivery nodes to respond to the one or more network requests. The method also includes publishing the first client code snippet to a snippet library, and indexing the first client code snippet in the snippet library. The method also includes receiving, from a second client, a request for a second client code snippet. The method also includes selecting a subset of client code snippets stored in the snippet library. The method also includes rendering identification information for the subset of client code snippets, and outputting a selected client code snippet from the subset of client code snippets.

20 Claims, 5 Drawing Sheets

(56) References Cited

U.S. PATENT DOCUMENTS

| | | | |
|---|---|---|---|
| 2015/0378692 A1* | 12/2015 | Dang | G06F 8/36 |
| | | | 717/106 |
| 2016/0078038 A1* | 3/2016 | Solanki | G06F 16/345 |
| | | | 707/727 |
| 2017/0126538 A1 | 5/2017 | Wistow et al. | |
| 2018/0189292 A1* | 7/2018 | Grace, Jr. | G06F 16/24578 |

OTHER PUBLICATIONS

Zycada Networks Inc., ISR/WO, PCT/US2020/041672, Nov. 13, 2020, 8 pgs.
Zycada Networks Inc., IPRP, PCT/US2020/041672, Jan. 18, 2022, 6 pgs.

* cited by examiner

PROGRAMMABLE DELIVERY NETWORK

RELATED APPLICATIONS

This application is a continuation of U.S. application Ser. No. 16/925,189, filed Jul. 9, 2020, entitled "PROGRAMMABLE DELIVERY NETWORK," which is a non-provisional application of and claims priority to U.S. Provisional Patent Application No. 62/873,637, filed Jul. 12, 2019, entitled, "PROGRAMMABLE DELIVERY NETWORK," each of which is hereby incorporated by reference in its entirety.

TECHNICAL FIELD

The various embodiments described in this document relate to content delivery networks, and in particular to programmable delivery networks that process cacheable and non-cacheable network requests.

BACKGROUND

Content delivery networks (CDNs) aim to serve content to end-users with high availability and high performance. In particular, CDNs deploy proxy servers in multiple, geographically diverse data centers (or edge nodes) to cache and serve the content. When the content is requested, the request is directed to the node that, for example, will require the fewest hops, or is the least number of network seconds away from the client requesting the content. Typically, this results in the selection of an edge node that is closest to the client. For example, a proxy server within a telecommunications service provider (TSP) network may cache and serve content to customers of the TSP to lessen demands on the network backbone, and to quickly and reliably deliver the content. Caching content in many locations to maximize the chances of having a proxy server close to any given client, however, can incur significant costs. Also, some content (e.g., dynamic content that needs constant refresh) may not be cacheable and the edge nodes processing the requests for such content will have to obtain the content from the origin servers hosting the content. Furthermore, in conventional CDNs, once the CDN is configured to respond to some network requests for an enterprise client, the CDN cannot be reconfigured to respond to other requests or adopt to dynamic network conditions.

SUMMARY

Accordingly, there is a need for programmable delivery networks that can be reconfigured and/or reprogrammed to respond to various non-cacheable and cacheable network requests for one or more clients. The systems and methods disclosed herein help provide fast responses to dynamic network requests, even while serving cacheable content, orchestrate network requests (e.g., request resources on behalf of end users as if the requests are originating from the end users), and thereby reduce overall network costs (e.g., avoid round-trip time to the origin servers).

In accordance with some embodiments, a method is provided for processing network requests. The method includes receiving a plurality of client code snippets. Each client code snippet is associated with a client. Each client code snippet includes (i) identity information of a respective one or more origin servers, and (ii) standard responses for a respective one or more network requests. In response to receiving a first client code snippet corresponding to a first client, the method includes configuring and causing a first one or more programmable content delivery nodes from amongst a plurality of programmable content delivery nodes to execute the first client code snippet to respond to network requests based on one or more standard responses included in the first client code snippet. The method also includes receiving one or more network requests corresponding to the first client. In response to receiving the one or more network requests, the method includes buffering the one or more network requests to send to a first one or more origin servers corresponding to the first client, the first one or more origin servers identified in first client code snippet. The method further includes, while buffering the one or more network requests, obtaining and outputting a response to a first network request of the one or more network requests by causing the first one or more programmable content delivery nodes to process the first network request. The method also includes sending the buffered one or more network requests to the first one or more origin servers corresponding to the first client. The method also includes receiving responses from the first one or more origin servers corresponding to the buffered one or more network requests. The method further includes reconfiguring the first one or more programmable content delivery nodes to execute the first client code snippet to respond to the network requests based on the received responses from the first one or more origin servers.

In some embodiments, the method includes determining a second one or more programmable content delivery nodes from amongst the plurality of programmable content delivery nodes to execute one or more master code snippets to monitor one or more client code snippets of the plurality of client code snippets executing on the plurality of programmable content delivery nodes. The method also includes configuring and causing the second one or more programmable content delivery nodes to execute the one or more master code snippets to monitor the one or more client code snippets.

In some embodiments, at least some of the operations of the one or more master code snippets are performed by a snippet engine.

In some embodiments, the one or more master code snippets include executable code (i) to monitor resource usage by the one or more client code snippets, and (ii) to determine and signal an anomaly in the resource usage by the one or more client code snippets.

In some embodiments, monitoring the resource usage includes measuring CPU time, memory requirements, number of I/O operations corresponding to the one or more client code snippets, and/or similar network or system resource monitoring operations. In some embodiments, the snippet engine performs the resource monitoring operations. Determining the anomaly in the resource usage includes (i) calculating a trend information for network traffic, normalizing the trend information, and the measured CPU time, memory requirements, and number of I/O operations to obtain a plurality of features, and (ii) predicting the anomaly by inputting the plurality of features to one or more trained machine learning models. Each machine learning model detects or is trained to detect (e.g., using supervised learning) anomalous behavior of client code snippets using features extracted from known misbehaving client code snippets and abnormal network conditions.

In some embodiments, one or more master code snippets further include executable code to shut down a rogue client code snippet of the one or more client code snippets. The rogue client code snippet indicates an anomaly in its resource usage.

In some embodiments, the one or more master code snippets further include executable code for (i) determining a fail-over mode while executing the plurality of client code snippets on the plurality of programmable content delivery nodes, and, (ii) in accordance with the determination of the fail-over mode, shutting down the execution of the plurality of client code snippets on the plurality of programmable content delivery nodes.

In some embodiments, the one or more master code snippets further include executable code for routing the one or more network requests to one or more non-programmable content delivery nodes, instead of buffering and responding to the one or more network requests.

In some embodiments, in response to receiving the first client code snippet corresponding to a first client, the method includes determining a second one or more programmable content delivery nodes from amongst the plurality of programmable content delivery nodes to execute the first client code snippet to respond to network requests corresponding to the first client. The method also includes configuring and causing the second one or more programmable content delivery nodes to execute the first client code snippet to respond to the network requests based on the first one or more standard responses. The method also includes obtaining a first threshold for processing of the one or more network requests by the first one or more programmable content delivery nodes. The method also includes, in response to receiving the one or more network requests, and while buffering the one or more network requests, (i) determining if network requests processed by the first one or more programmable content delivery nodes is above the first threshold, and (ii) in accordance with a determination that network requests processed by the first one or more programmable content delivery nodes is above the first threshold, obtaining and outputting a response to the first network request by causing the second one or more programmable content delivery nodes to process the first network request.

In some embodiments, each client code snippet further includes a distribution ratio for distributing processing of network requests amongst a plurality of one or more programmable content delivery nodes. Obtaining the first threshold includes calculating the first threshold based on the distribution ratio included in the first client code snippet.

In some embodiments, the method further includes determining an overall transactional cost for the first client based on (i) a number of orchestrations performed, and (ii) a cost of resources incurred, while handling each client code snippet corresponding to the first client. In some embodiments, the resources include memory, computational resources, and network bandwidth.

In some embodiments, the orchestrations include operations for configuring and causing the first one or more programmable content delivery nodes to execute the first client code snippet to respond to the network requests. The orchestrations also include operations for receiving one or more network requests corresponding to the first client. The orchestrations also include operations for buffering the one or more network requests to send to the first one or more origin servers corresponding to the first client. The orchestrations also include operations for obtaining and outputting the response to the first network request of the one or more network requests by causing the first one or more programmable content delivery nodes to process the first network request. The orchestrations also include operations for sending the buffered one or more network requests to the first one or more origin servers corresponding to the first client. The orchestrations also include operations for receiving responses from the first one or more origin servers corresponding to the buffered one or more network requests, and updating the first one or more standard responses to network requests based on the responses from the first one or more origin servers.

In some embodiments, each client code snippet is written in a respective programming language of a plurality of plurality programming languages (e.g., JavaScript, Golang, WASM, Lua, Python). Configuring the first one or more programmable content delivery nodes further includes determining a first programming language of the plurality of programming languages corresponding to the first client code snippet, and configuring a first process of a plurality of processes to execute the first client code snippet written in the first programming language. Each process of the plurality of processes is configured to execute a respective programming language.

In some embodiments, the method includes, prior to configuring the first one or more programmable content delivery nodes, determining if the first client code snippet meets a predetermined safety threshold by executing and monitoring the first client code snippet on an isolated set of programmable content delivery nodes from amongst the plurality of programmable content delivery nodes, the isolated set of content delivery nodes not sharing resources with other programmable content delivery nodes and not executing any client code snippet other than the first client code snippet. In accordance with a determination that the first client code snippet meets the predetermined safety threshold, the method includes configuring the first one or more programmable content delivery nodes in a plurality of stages, each stage including a distinct subset of the first one or more programmable content delivery nodes, and each subsequent stage including an increasing number of programmable content delivery nodes.

In some embodiments, each client code snippet of the plurality of client code snippets executes on distinct subsets of programmable content delivery nodes of the plurality of programmable content delivery nodes.

In some embodiments, configuring the first one or more programmable content delivery nodes includes (i) determining the first one or more programmable content delivery nodes from amongst the plurality of programmable content delivery nodes to execute the first client code snippet to respond to network requests corresponding to the first client; (ii) determining the first one or more origin servers corresponding to the first client based on the identity information included in the first client code snippet; (iii) determining a first one or more standard responses for the network requests based on the standard responses included in the first client code snippet; and (iv) configuring the first one or more programmable content delivery nodes to execute the first client code snippet to respond to the network requests based on the first one or more standard responses.

In some embodiments, each client code snippet further includes network configuration parameters. Determining the first one or more programmable content delivery nodes from amongst the plurality of programmable content delivery nodes includes identifying the first one or more programmable content delivery nodes based on the network configuration parameters included in the first client code snippet.

In some embodiments, the method includes configuring a network to communicatively couple the first one or more programmable content delivery nodes.

In some embodiments, the method further includes, prior to sending the buffered one or more network requests to the first one or more origin servers, determining if the first one or more origin servers are unavailable, and, in accordance with a determination that the first one or more origin servers are unavailable, continuously monitoring the first one or more origin servers to determine a time to send the network requests.

In some embodiments, the method further includes, in accordance with a determination that the first one or more origin servers are unavailable, determining a first origin server from amongst the first one or more origin servers that is available, and sending the buffered one or more network requests to the first origin server.

In some embodiments, the plurality of programmable content delivery nodes are edge servers close to end users.

In another aspect, a method of provisioning snippets for programming a content delivery network is provided. The method includes receiving, by a system comprising a processor, a first client code snippet from a first client. The first client code snippet includes at least one of (i) identity information of one or more origin servers, (ii) standard responses for one or more network requests, and (iii) configuration parameters to configure the content delivery network to respond to the one or more network requests. In response to receiving the first client code snippet, the method includes publishing, by the system, the first client code snippet to a snippet library, and indexing, by the system, the first client code snippet in the snippet library based on one or more metadata included in the first client code snippet. In some embodiments, the snippet library resides on a cloud platform. In some embodiments, the snippet library classifies the first client code snippet according to predetermined hierarchical categories (e.g., categories specified by one or more clients). The method also includes receiving, by the system, from a second client, a request for a second client code snippet. In response to receiving the request for the second client code snippet, the method includes selecting, by the system, a subset of client code snippets stored in the snippet library. The method further includes rendering, by the system, identification information for the subset of client code snippets, and outputting, by the system, a selected client code snippet from the subset of client code snippets.

In some embodiments, the method further includes, prior to publishing the first client code snippet to the snippet library, verifying, by the system, access privileges of the first client to access the snippet library. In some embodiments, the method further includes, prior to selecting the subset of client code snippets stored in the snippet library, verifying, by the system, access privileges of the second client to access the snippet library.

In some embodiments, the content delivery nodes includes a subset of programmable nodes to configure to respond to the one or more network requests, and the method further includes, prior to publishing the first client code snippet to the snippet library, validating, by the system, the first client code snippet for responses to the one or more network requests using the subset of nodes.

In accordance with some implementations, an electronic device has one or more processors and memory storing one or more programs executable by the one or more processors. The one or more programs include instructions for performing any of the methods described herein.

In accordance with some implementations, a non-transitory computer-readable storage medium has one or more processors and memory storing one or more programs executable by the one or more processors. The one or more programs include instructions for performing any of the methods described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
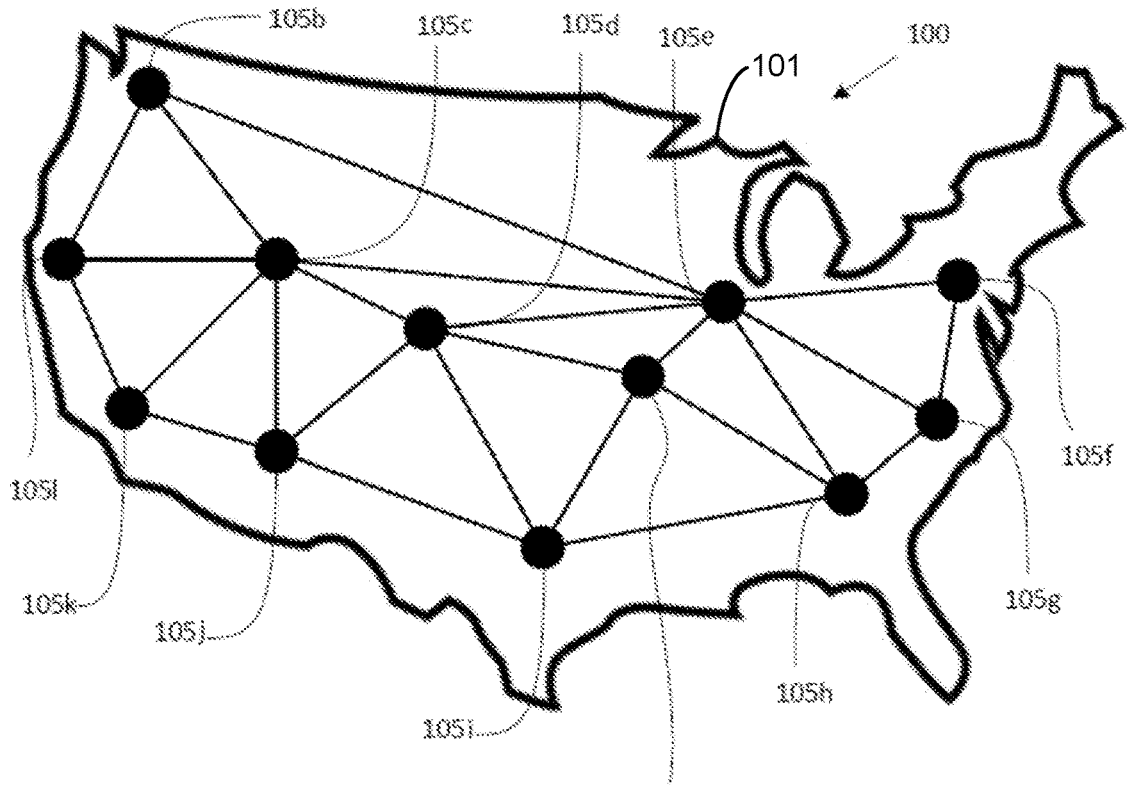
FIG. 1 is a block diagram of an example programmable delivery network according to some embodiments.
Figure 1:
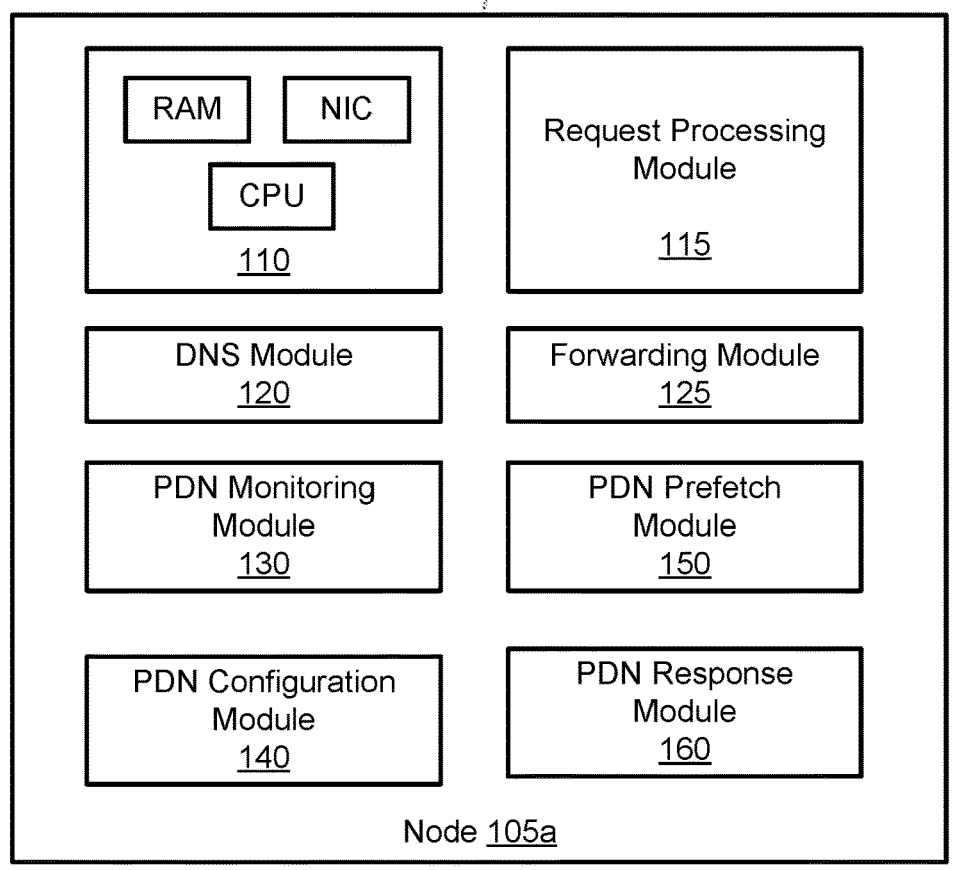

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1 is a block diagram of an example programmable delivery network 100 of proxy server nodes 105 (e.g., nodes 105a, 105b, 105c, 105d, 105e, 105f, 105g, 105h, 105i, 105j, 105k, and 105l) that can be programmed to respond to network requests (e.g., cacheable or non-cacheable request from end users), according to some embodiments. The network 100 includes a geographically distributed set of proxy server nodes 105 deployed in multiple data centers across a geographical region 101 (e.g., one or more cities, states, countries, or continents). The network 100 may include more or fewer nodes 105 than illustrated.

In some embodiments, a respective node 105 (e.g., as illustrated by node 105a) includes hardware 110. Hardware 110 includes one or more processors ("CPU(s)"), data storage and memory (e.g., "RAM"), and network interface controllers ("NIC(s)"). The data storage and memory may be used for storing data, metadata, and programs (e.g., request processing module 115, DNS module 120, forwarding module 125, PDN (Programmable Delivery Network) monitoring module 130, PDN configuration module 140, PDN prefetch module 150, and PDN response module 160) for execution by the processor(s). In some embodiments, the data storage and memory may include one or more of volatile and non-volatile memories, such as Random Access Memory ("RAM"), Read Only Memory ("ROM"), a solid state disk ("SSD"), Flash, Phase Change Memory ("PCM"), and/or other types of data storage, such as magnetic disk drives, optical disk drives, etc. In some embodiments, the memory includes internal and/or distributed memory. In some embodiments, one or more buses (not shown) interconnect the various components of hardware 110. In some embodiments, NIC(s) connect one more of nodes 105 (e.g., nodes 105a-105l), via a wired and/or wireless network, with other nodes 105, client devices external to mesh network 100, and/or server devices external to mesh network 100.

In some embodiments, a respective node (e.g., as illustrated by node 105a) includes multiple modules. Each of these modules may be embodied in hardware, software, or a combination of hardware and software. A request processing module 115 processes requests (or traffic) from client computer systems, generates requests to other nodes or website servers to obtain content for caching, and transmits content to the client computer systems. In some embodiments, a respective node 105 (e.g., as illustrated by node 105a) includes a domain name system (DNS) module 120. The DNS module 120 stores next hop information for transmitting the requests to other nodes or website servers. For example, respective nodes 105 may determine respective neighboring nodes 105 and track the next hop for traffic using an address discovery protocol. In some embodiments, a respective node 105 (e.g., as illustrated by node 105a) includes a forwarding module 125. The forwarding module 125 receives traffic from a client, service, or another node 105, determines a service and/or destination from the received traffic, and/or selects the next hop using the mapping stored by the DNS module 120.

In some embodiments, a node 105 (e.g., node 105a) includes the PDN monitoring module 130 configured to monitor performance of one or more nodes of the PDN (e.g., identify rogue nodes that violate network policy) and/or monitor resource utilization. In some embodiments, a node 105 (e.g., node 105a) includes the PDN configuration module 140 to configure the PDN (e.g., identify nodes, cause one or more nodes to run executable code, allocate network resources, identify logical and/or physical groupings of the nodes). In some embodiments, a node 105 (e.g., node 105a) includes the PDN prefetch module 150 configured to prefetch and temporarily store content (e.g., non-cacheable content, cacheable compressed content) in response to a request from a client device (sometimes called a user device or an end user device) to access a webpage that includes one or more links to the content, and provides the content to the client device in response to subsequent request(s) (e.g., requests in the same user session). In some embodiments, a node 105 (e.g., node 105a) includes the PDN response module 160 for generating snappy (or fast) responses to network requests (e.g., while the PDN prefetch module 150 prefetches content for serving future requests).

Figure 2:
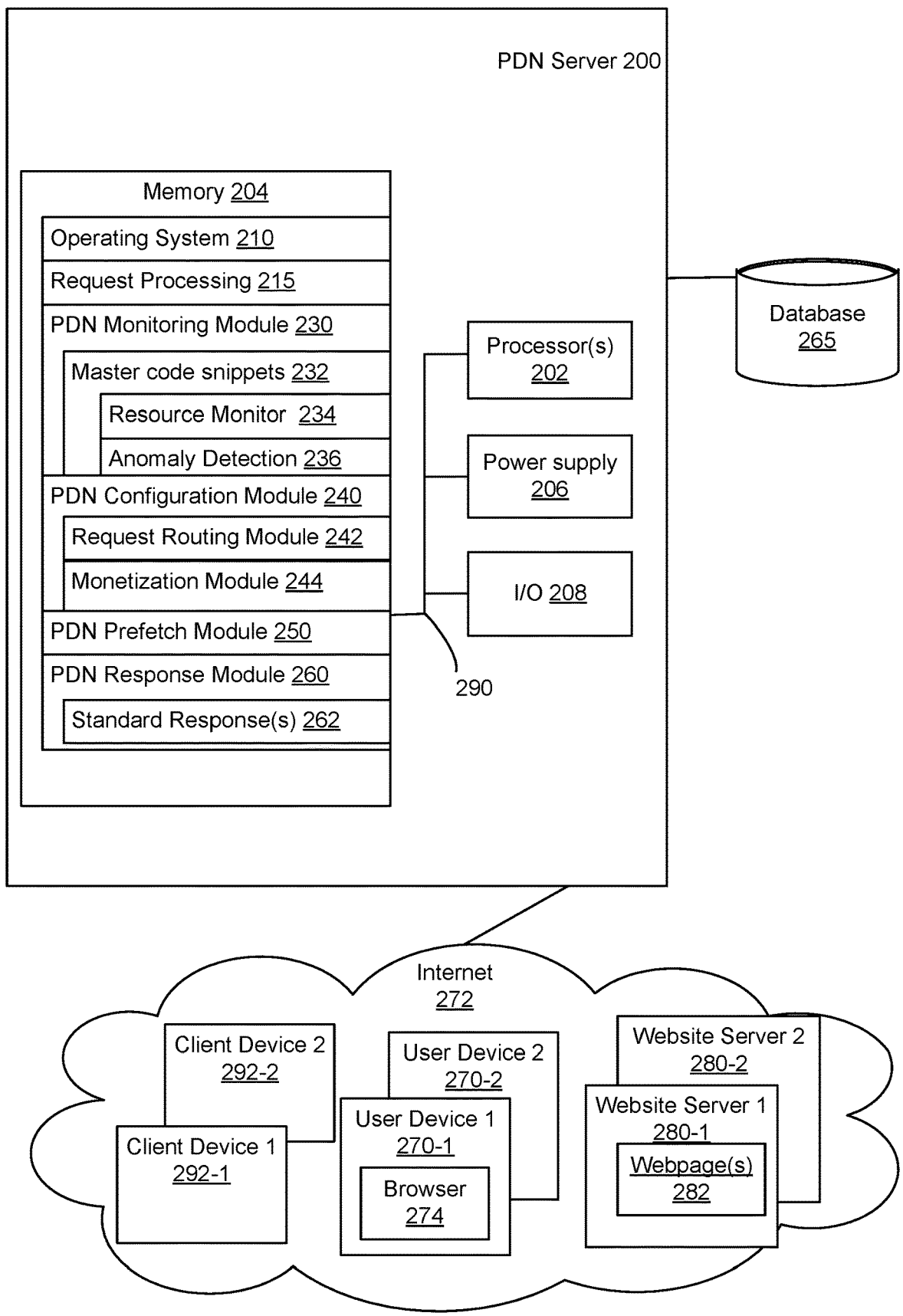
FIG. 2 is a system diagram of a server in a node of the programmable delivery network, in accordance with some embodiments.

In some embodiments, each node 105 in the programmable delivery network 100 includes one or more proxy servers for processing client requests for application and content data. FIG. 2 is a system diagram of server 200 (sometimes called the PDN server 200) in a node 105 (e.g., node 105a), in accordance with some embodiments. Server 200 typically includes one or more processor(s) 202, a memory 204, a power supply 206, an input/output (I/O) subsystem 208, and a communication bus 290 for interconnecting these components.

Processor(s) 202 execute modules, programs and/or instructions stored in memory 204 and thereby perform processing operations, including the methods described herein according to some embodiments.

In some embodiments, the memory 204 stores one or more programs (e.g., sets of instructions), snippets (sometimes called code snippets), and/or data structures, collectively referred to as "modules" herein. In some embodiments, memory 204, or the non-transitory computer readable storage medium of memory 204, stores the following programs, snippets, modules, and data structures, or a subset or superset thereof:

- an operating system 210;
- a request processing module 215;
- a PDN monitoring module 230, which includes master code snippets 232, which monitor the PDN (e.g., other nodes in the network), which includes, for example, a resource monitoring module 234 (for monitoring resources consumed by snippets), and an anomaly detection module 236 to detect network and/or anomalies at the node levels;
- a PDN configuration module 240, which includes, for example, a request routing module 242 for routing network requests (e.g., based on user-provided thresholds) to the nodes, and a monetization module 244 that computes a dollar cost for serving network requests (e.g., based on a number of operations or orchestrations performed for satisfying a network request);
- a PDN prefetch module 250 that prefetches and/or buffers cacheable or dynamic network content from one or more origin servers (e.g., destination nodes or servers with content corresponding to network requests); and
- a PDN response module 260 that retrieves standard responses 262 and serves the responses to network requests (e.g., while the PDN prefetch module 250 processes network requests).

The above identified modules (e.g., data structures, and/or programs including sets of instructions) need not be implemented as separate software programs, snippets, procedures, or modules, and thus various subsets of these modules may be combined or otherwise re-arranged in various embodiments. In some embodiments, memory 204 stores a subset of the modules identified above. In some embodiments, a database 265 (e.g., a local database and/or a remote database) stores one or more modules identified above and data associated with the modules. Furthermore, the memory 204 may store additional modules not described above. In some embodiments, the modules stored in memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more of processor(s) 202.

In some embodiments, the PDN monitoring module 230, the PDN configuration module 240, the PDN prefetch module 250, and/or the PDN response module 260 are dynamically loadable modules loaded and executed by a snippet engine. In various embodiments, the snippet engine is a virtual machine (e.g., a Java Virtual Machine), or a runtime module (e.g., a Golang runtime). In some embodiments, the snippet engine runs on each programmable content delivery node. In some embodiments, the snippet engine runs on a predetermined set of programmable content delivery nodes.

I/O subsystem 208 communicatively couples server 200 to one or more devices such as website servers (e.g., 280-1, 280-2, . . . ) hosting webpages 282, one or more user devices (e.g., 270-1, 270-2, . . . ), and/or one or more client devices (e.g., 292-1, 292-2, . . . ), via a local and/or wide area communications network 272 (e.g., the Internet) via a wired and/or wireless connection. Each user device (e.g., user device 270-1) can request access to a webpage hosted by website servers 280 via an application such as a browser 274. Each client device (e.g., device 292-1) can send (or upload) code snippets (e.g., master code snippets 232) to run on the server 200.

Communication bus 290 optionally includes circuitry (sometimes called a chipset) that interconnects and controls communications between system components.

Figure 3:
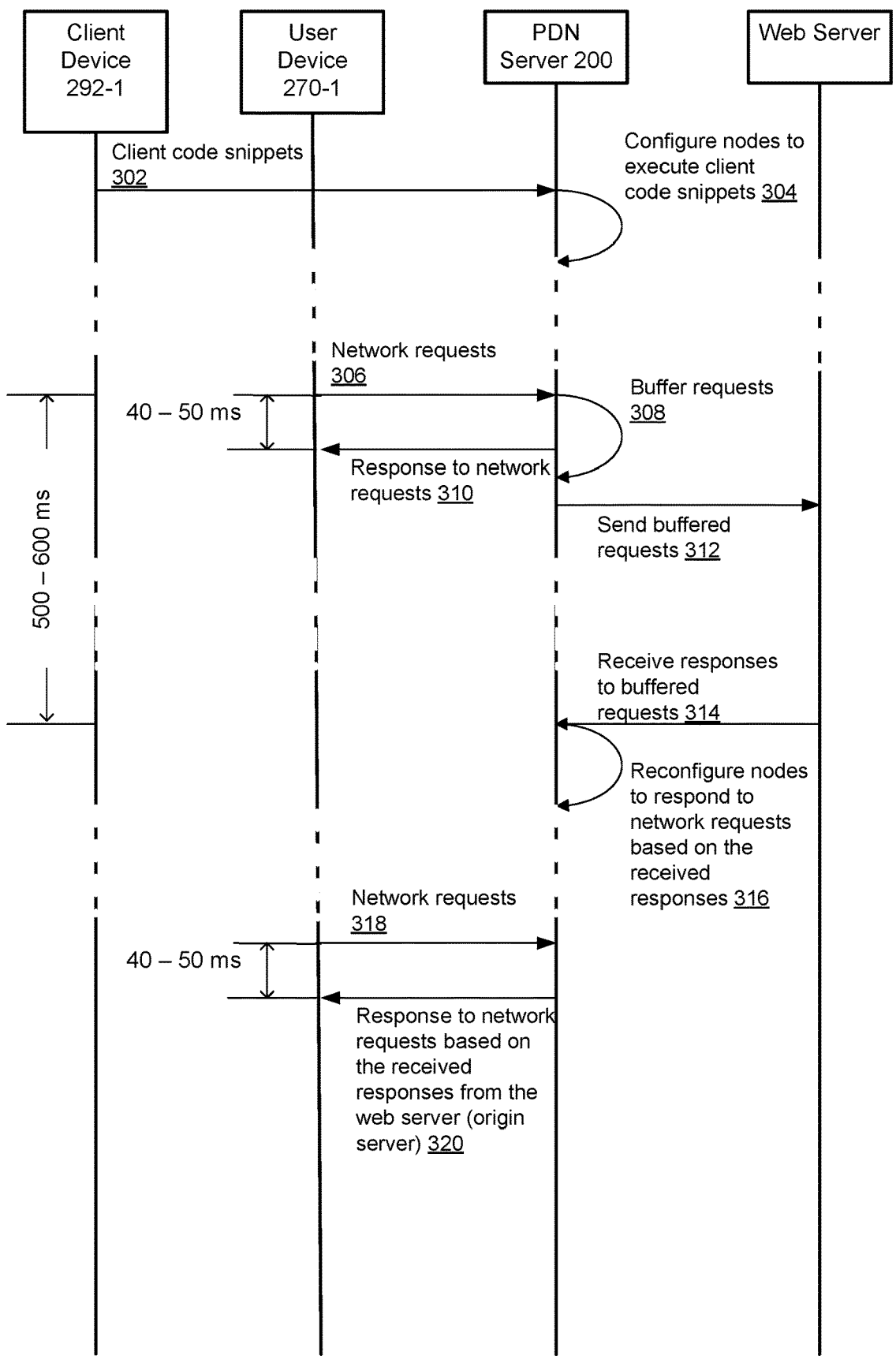
FIG. 3 is a sequence diagram illustrating exemplary method of generating responses for network requests in programmable delivery networks according to some embodiments.

FIG. 3 is a sequence diagram illustrating exemplary method of generating responses for network requests in programmable delivery networks according to some embodiments. As shown, the method can be performed at a Node (e.g., the node 105 or the PDN server 200) in a network (e.g., the network 272) by executing one or more modules shown in FIG. 2 (described above). In some embodiments, the method includes receiving (302) a plurality of client code snippets (e.g., executable code to run on the node 105 received from the client device 292-1). Each client code snippet is associated with a client (e.g., an enterprise or a company with a website server, a social networking company, an e-commerce company, an application developer). Each client code snippet includes (i) identity information of a respective one or more origin servers (e.g., the website server 280-1), and (ii) standard responses for a respective one or more network requests.

Examples of the network requests include dynamic requests that cannot be cached (e.g., requests with response that is constantly changing) and cacheable or static requests (e.g., requests with a constant response). To further illustrate, the non-cacheable or dynamic requests include network requests, such as a request to view items in a shopping cart, a request to view most frequently viewed or purchased items in an e-Commerce website, a request to view personalized recommendations for a user, a request to view the recently viewed items or pages, a request to view the availability of an item in an e-Commerce or a travel web site, a request to view average customer reviews, or a user selecting or clicking a "like" button in a webpage. Examples of standard responses include standard HTTP responses, such as 404 error, or 200 ok.

An example of cacheable content includes an image or a picture that is static. In other words, the content does not change and can be cached. The systems and methods described herein can help provide content tailored to the capabilities of an end user, according to some embodiments. For example, suppose there are two end users X and Y, and each user requests an image. If user X is using a low-power device and/or a network that does not provide high bandwidth or has a lossy network connection, one or more nodes of the programmable delivery network is programmed to compress or substantially compress the image and/or store or buffer the compressed image to serve X's request. On the other hand, the programmable delivery network continues to serve a higher resolution version of the image to user Y. In some embodiments, a client user (e.g., an enterprise client) may have specific requirements for the delivery of the static content. For example, company or developer client A may request to configure the nodes of the programmable delivery network to always serve lower resolution versions of images while client B may request to configure the nodes to always server higher resolution images. Because client identifiers are known to the nodes of the programmable delivery network, the nodes can provide different versions of the same static content to end users of the respective clients.

In response to receiving a first client code snippet corresponding to a first client, the method includes configuring and causing (304) a first one or more programmable content delivery nodes (e.g., the nodes 105f through 105k) from amongst a plurality of programmable content delivery nodes (e.g., the nodes 105) to execute the first client code snippet to respond to network requests based on one or more standard responses included in the first client code snippet. For example, the PDN response modules 260 and/or the PDN prefetch modules 250 in the nodes 105f through 105k are configured to respond to network requests for one or more clients.

An example code snippet is provided below for illustration.

```
--- CODE ---
import "snippet" as snippet;
var s = snippet.newSnippet( );
s.onRequest("/", function (ctx, req, resp) {
    var key = ctx.currentTime( ).minute + "|" + req.url + "|" + req.getRemoteIP( );
    var counter = ctx.incrementAndGetCount(key);
    // If there are more than 100 requests per minute
    // from this client, deny the request.
    if (counter > 100) {
        ctx.sendError(400);
        return;
    }
    ctx.getChain( ).continue(req, resp);
});
s.activate( );
```

The method also includes receiving (306) one or more network requests (e.g., requests generated from the browser 274 of the user device 270-1) corresponding to the first client. In response to receiving the one or more network requests, the method includes buffering (308) the one or more network requests (e.g., buffering by the PDN prefetch module 250) to send to a first one or more origin servers (e.g., website server 280-1) corresponding to the first client, the first one or more origin servers identified in the first client code snippet.

The method further includes, while buffering the one or more network requests, obtaining and outputting (e.g., by the PDN response module 260; operation 310) a response to a first network request of the one or more network requests by causing the first one or more programmable content delivery nodes to process the first network request. The method also includes sending (e.g., by the PDN prefetch module 250; operation 312) the buffered one or more network requests to the first one or more origin servers (e.g., the website server 280-1) corresponding to the first client. The method also includes receiving (314) responses from the first one or more origin servers corresponding to the buffered one or more network requests. The method further includes reconfiguring (316) the first one or more programmable content delivery nodes to execute the first client code snippet to respond (e.g., subsequent response 320) to the network requests (i.e., subsequent requests, such as request 318) based on the received responses from the first one or more origin servers. For example, one or more standard responses 262 are updated for future responses to network requests for the first client.

In some embodiments, the method includes determining a second one or more programmable content delivery nodes from amongst the plurality of programmable content delivery nodes to execute one or more master code snippets (sometimes called monitor code snippets; e.g., the snippets 232) to monitor one or more client code snippets of the plurality of client code snippets executing on the plurality of programmable content delivery nodes. The method also includes configuring and causing the second one or more programmable content delivery nodes to execute the one or more master code snippets to monitor the one or more client code snippets. In some embodiments, the master code snippets 232 are received from the client devices 292. In some embodiments, the master code snippets 232 are retrieved from a standard set of master code snippets for the client (or for similar or past clients).

In some embodiments, the one or more master code snippets include executable code (i) to monitor resource usage (e.g., the resource monitor 234) by the one or more client code snippets, and (ii) to determine and signal an anomaly in the resource usage by the one or more client code snippets.

In some embodiments, monitoring the resource usage comprises measuring CPU time, memory requirements, and number of I/O operations corresponding to the one or more client code snippets. Determining the anomaly (e.g., by the anomaly detection module 236) in the resource usage includes (i) calculating a trend information for network traffic, normalizing the trend information, and the measured CPU time, memory requirements, and number of I/O operations to obtain a plurality of features, and (ii) predicting the anomaly by inputting the plurality of features to one or more trained machine learning models. Each machine learning model is trained to detect anomalous behavior of client code snippets using features extracted from known misbehaving client code snippets and abnormal network conditions (e.g., a condition similar to a Denial-of-Service attack, a CPU hog).

An example code snippet that is used to stop a rogue snippet that is consuming CPU resource for longer than 5 seconds is provided below for illustration.

```
--- CODE ---
// A sample snippet that is monitored
// for execution for upto 5 seconds.
import "snippet" as snippet;
var s = snippet.newSnippet( );
s.onRequest("/", function (ctx, req, resp) {
  // Go to upstream and fetch the response.
  ctx.getChain( ).continue(req, resp);
});
// Tell the snippet engine to stop this snippet
// after 5 seconds.
s.setTimeoutMillis(5000);
s.activate( );
```

As shown in the example above, in some embodiments, a single code snippet could perform the operations of client code snippets and master code snippets as described above and below. For example, a code snippet could respond to network requests (based on standard responses) during a first time period, and function as a monitoring code during another time period.

In some embodiments, one or more master code snippets further include executable code to shut down (or to cause to shutdown) a rogue client code snippet of the one or more client code snippets when the rogue client code snippet indicates an anomaly in its resource usage (e.g., an infinite loop causing a CPU hog, accessing an unavailable network asset or resource).

In some embodiments, the one or more master code snippets further include executable code for (i) determining a fail-over mode while executing the plurality of client code snippets on the plurality of programmable content delivery nodes, and (ii) in accordance with the determination of the fail-over mode, shutting down the execution of the plurality of client code snippets on the plurality of programmable content delivery nodes.

An example code snippet is provided below for illustration. In this example, a fail-over server is configured to take over if a primary server fails.

```
--- CODE ---
import "snippet" as snippet;
var s = snippet.newSnippet( );
s.onRequest("/", function (ctx, req, resp) {
  // Go to upstream and fetch the response.
  var err = ctx.getChain( ).continue(req, resp);
  if (err != null) {
    // In case of any errors, get the fail over
    // chain that sends request to backup server.
    ctx.getFailoverChain( ).continue(req, resp);
  }
});
// Use this server when the primary server fails.
s.setFailoverServer("failover.example.com");
s.activate( );
```

In some embodiments, the one or more master code snippets further include executable code for routing (or forwarding; e.g., by the forwarding module 125) the one or more network requests to one or more non-programmable content delivery nodes, instead of buffering and responding to the one or more network requests.

In some embodiments, in response to receiving the first client code snippet corresponding to a first client, the method includes determining a second one or more programmable content delivery nodes from amongst the plurality of programmable content delivery nodes to execute the first client code snippet to respond to network requests corresponding to the first client. For example, the first one or more programmable content delivery nodes include nodes 105a through 105e, and subsequently the method includes selecting nodes 105f through 105i as the second one or more programmable content delivery nodes. The method also includes configuring and causing (e.g., by the PDN configuration module 240) the second one or more programmable content delivery nodes to execute the first client code snippet to respond to the network requests based on the first one or more standard responses. This operation is similar to how the first one or more programmable content delivery nodes are configured (as described above). The method also includes obtaining a first threshold for processing of the one or more network requests by the first one or more programmable content delivery nodes. The method also includes, in response to receiving the one or more network requests, and while buffering the one or more network requests, (i) determining if network requests processed by the first one or more programmable content delivery nodes is above the first threshold, and (ii) in accordance with a determination that network requests processed by the first one or more programmable content delivery nodes is above the first threshold, obtaining and outputting a response to the first network request by causing the second one or more programmable content delivery nodes to process the first network request. For example, the request routing module 242 performs the operations (i) and (ii). Thus, the PDN handles precise routing of network requests by dividing the requests amongst the nodes of the network according to network load (dynamic behavior) or as statically determined by the clients, according to some embodiments. In some embodiments, each client code snippet further includes a distribution ratio for distributing processing of network requests amongst a plurality of one or more programmable content delivery nodes. Obtaining the first threshold includes calculating the first threshold based on the distribution ratio included in the first client code snippet.

In some embodiments, the method further includes determining an overall transactional cost (e.g., by the monetization module 244) for the first client based on (i) a number of orchestrations performed, and/or (ii) a cost of resources incurred, while handling each client code snippet corresponding to the first client.

In some embodiments, the orchestrations include operations for configuring and causing the first one or more programmable content delivery nodes to execute the first client code snippet to respond to the network requests. The orchestrations also include operations for receiving one or more network requests corresponding to the first client. The orchestrations also include operations for buffering the one or more network requests to send to the first one or more origin servers corresponding to the first client. The orchestrations also include operations for obtaining and outputting the response to the first network request of the one or more network requests by causing the first one or more programmable content delivery nodes to process the first network request. The orchestrations also include operations for sending the buffered one or more network requests to the first one or more origin servers corresponding to the first client. The orchestrations also include operations for receiving responses from the first one or more origin servers corresponding to the buffered one or more network requests, and updating the first one or more standard responses to network requests based on the responses from the first one or more origin servers. In some embodiments, the operations counted for monetization include a subset of operations described above. In some embodiments, the resources include memory, computational resources, and network bandwidth.

In some embodiments, each client code snippet is written in a respective programming language of a plurality of plurality programming languages (e.g., JavaScript, Golang, WASM, Lua, Python). Configuring the first one or more programmable content delivery nodes further includes determining a first programming language of the plurality of programming languages corresponding to the first client code snippet, and configuring a first process of a plurality of processes to execute the first client code snippet written in the first programming language. Each process of the plurality of processes is configured to execute a respective programming language.

In some embodiments, new client code snippets uploaded by or received from a client device (e.g., the device 292-1) are tested and released using a canary release to mitigate risks. The method includes, prior to configuring the first one or more programmable content delivery nodes, determining if the first client code snippet meets a predetermined safety threshold (e.g., no CPU hogs or network resource hogs for a period of time or as determined during time intervals) by executing and monitoring the first client code snippet on an isolated set of programmable content delivery nodes (e.g., only nodes 102c and 102d after isolating the nodes from the network) from amongst the plurality of programmable content delivery nodes. The isolated set of content delivery nodes do not share resources with other programmable content delivery nodes and do not execute any client code snippet other than the first client code snippet. In accordance with a determination that the first client code snippet meets the predetermined safety threshold, the method includes configuring the first one or more programmable content delivery nodes in a plurality of stages, each stage including a distinct subset of the first one or more programmable content delivery nodes, and each subsequent stage including an increasing number of programmable content delivery nodes.

In some embodiments, the client code snippets run on non-overlapping programmable content delivery nodes. In other words, each client code snippet of the plurality of client code snippets executes on distinct subsets of programmable content delivery nodes of the plurality of programmable content delivery nodes.

In some embodiments, configuring the first one or more programmable content delivery nodes (e.g., as performed by the PDN configuration module 240) includes: (i) determining the first one or more programmable content delivery nodes from amongst the plurality of programmable content delivery nodes to execute the first client code snippet to respond to network requests corresponding to the first client; (ii) determining the first one or more origin servers corresponding to the first client based on the identity information included in the first client code snippet; (iii) determining a first one or more standard responses for the network requests based on the standard responses included in the first client code snippet; and (iv) configuring the first one or more programmable content delivery nodes to execute the first client code snippet to respond to the network requests based on the first one or more standard responses.

In some embodiments, each client code snippet further includes network configuration parameters (e.g., as to the topology of the network, such as a mesh architecture, a number of nodes for the network, latency or throughput parameters for the network). Determining the first one or more programmable content delivery nodes from amongst the plurality of programmable content delivery nodes includes identifying the first one or more programmable content delivery nodes based on the network configuration parameters included in the first client code snippet.

In some embodiments, the method includes configuring a network to communicatively couple the first one or more programmable content delivery nodes. For example, first one or more programmable content delivery nodes are connected (logically and/or physically) to communicate with one another.

In some embodiments, the method further includes, prior to sending the buffered one or more network requests to the first one or more origin servers, determining if the first one or more origin servers are unavailable (e.g., the servers are overloaded, offline, or in a failure mode), and, in accordance with a determination that the first one or more origin servers are unavailable, continuously monitoring the first one or more origin servers to determine a time to send the network requests.

In some embodiments, the method further includes, in accordance with a determination that the first one or more origin servers are unavailable, determining a first origin server from amongst the first one or more origin servers that is available, and sending the buffered one or more network requests to the first origin server.

In some embodiments, the plurality of programmable content delivery nodes are edge servers close to end users. In some embodiments, the nodes are logical processes running on servers situated close to end users (i.e., relative to the origin or web servers). In some embodiments, a physical server (e.g., a hardware) is configured to run several programmable content delivery nodes as logical processes.

It will be apparent from this description that aspects of the inventions may be embodied, at least in part, in software. In other words, the request processing module 115, the DNS module 120, the forwarding module 125, the PDN monitoring module 130, the PDN configuration module 140, the PDN prefetch module 150, and the PDN response module 160, and/or computer-implemented method may be implemented or otherwise carried out in a computer system or other data processing system, such as one or more respective nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node 105. It will also be appreciated that additional components, not shown, may also be part of nodes 105, and, in certain embodiments, fewer components than that shown in FIG. 1 may also be used in nodes 105.

Figure 4A:
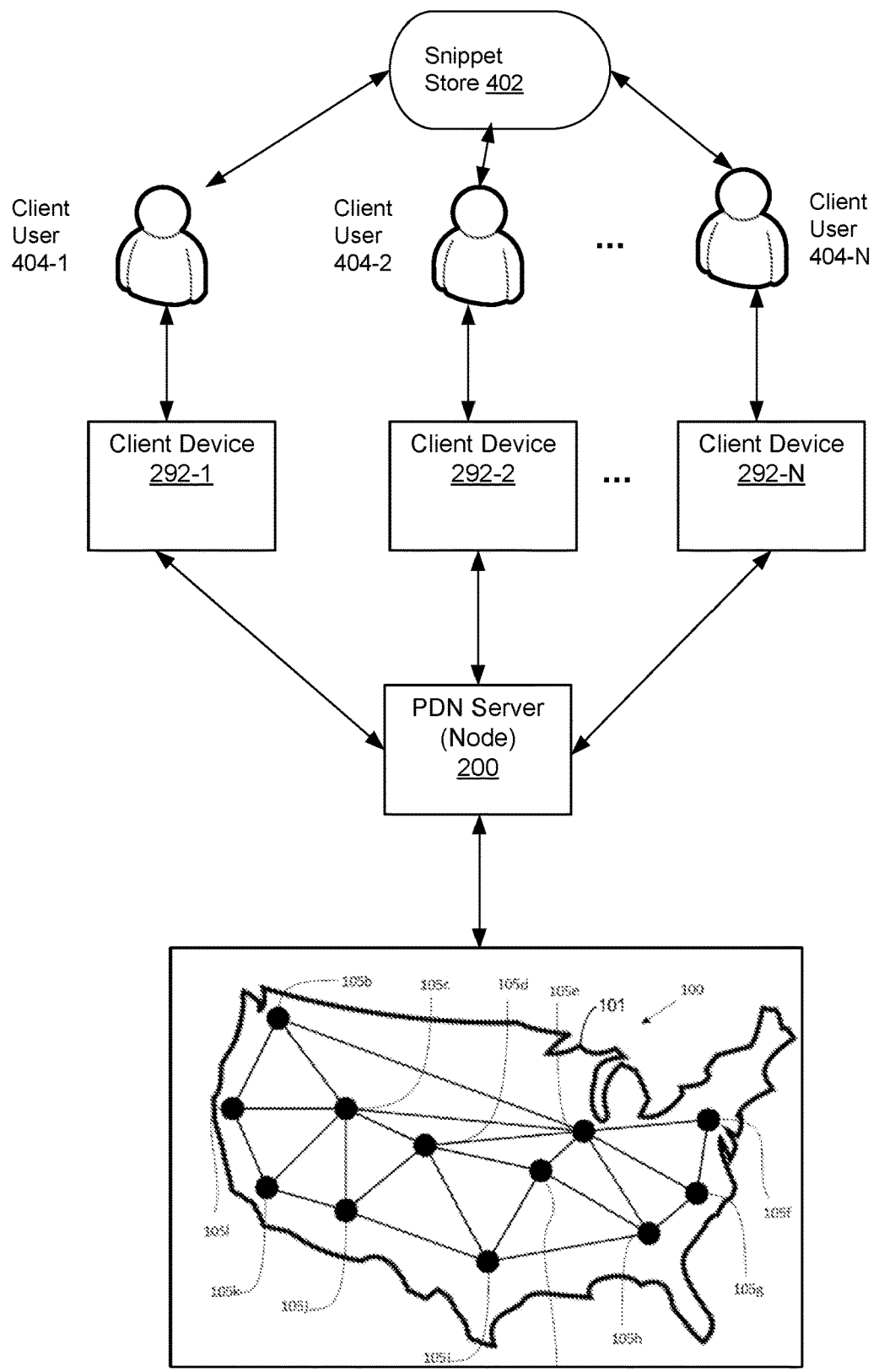
FIG. 4A is a block diagram illustrating an example snippet store or ecosystem used by client users to develop snippets deployed in a programmable delivery network according to some embodiments.

FIG. 4A is a block diagram illustrating an example snippet store (402) or ecosystem used by client users (e.g., users 404-1, 404-2, . . . , 404-N) to develop snippets deployed in a programmable delivery network according to some embodiments. The client users are typically application developers or front-end developers of e-Commerce companies (e.g., Walmart, Target) or social networking companies (e.g., Facebook) that develop code snippets (described above) based on snippets uploaded by other client users. In some embodiments, the snippet store 402 also includes pre-loaded templates for developing master code snippets and/or client code snippets. As shown, client users use devices (e.g., devices 202-1, 202-2, . . . , 202-N) to develop and/or upload (or send) snippets to a PDN server 200 (sometimes called the node; e.g., the node 105a) which configures (either logically or physically) a group of programmable content delivery nodes (in the network 100) to respond to dynamic network requests and/or cacheable requests. The network requests include requests from an end user (e.g., requests for a network asset from an origin server).

Figure 4B:
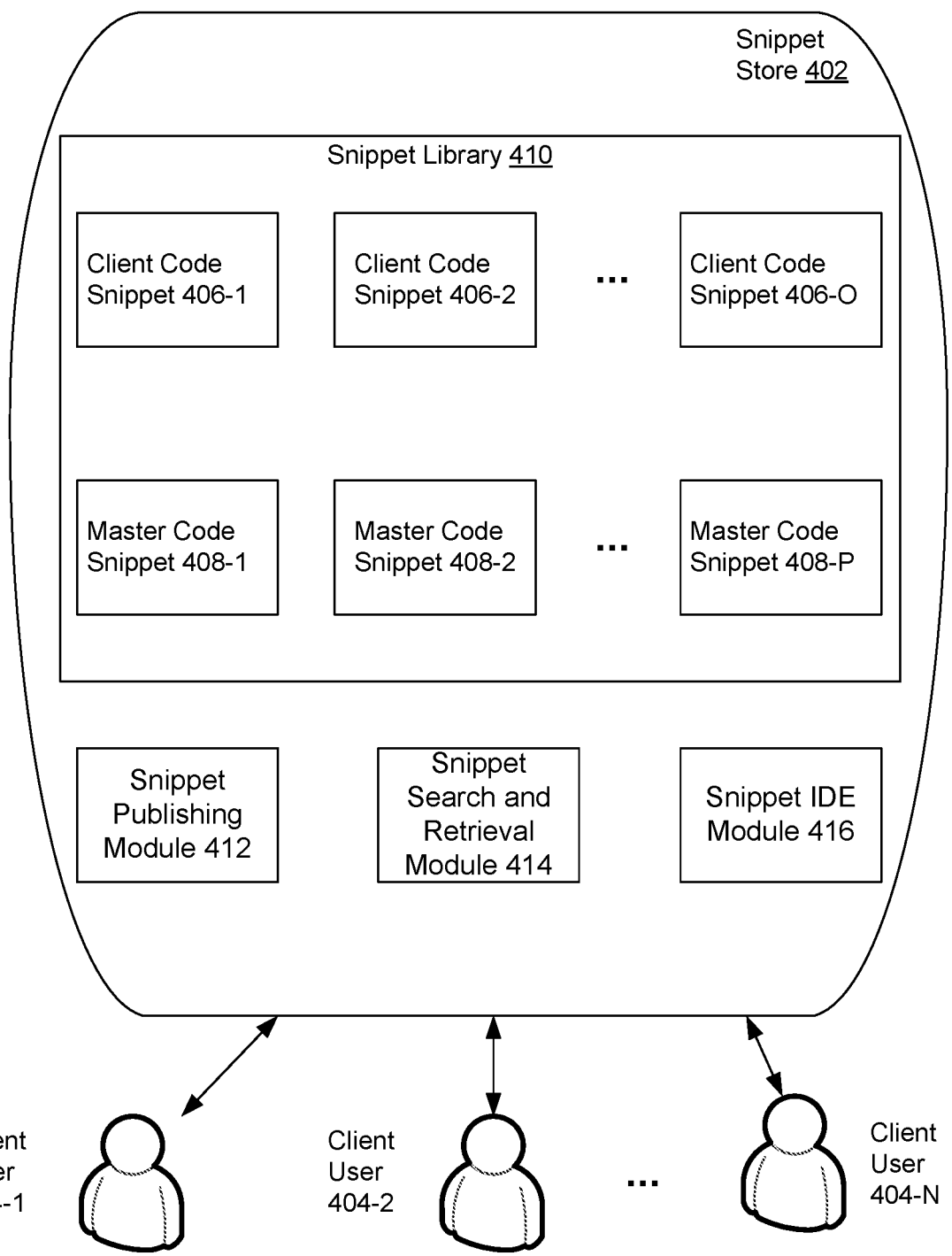
FIG. 4B is a block diagram illustrating an example snippet store for clients to develop and launch code snippets to program content delivery nodes according to some embodiments.

FIG. 4B is a block diagram illustrating an example snippet store 402 for clients to develop and launch code snippets to program content delivery nodes according to some embodiments. The snippet store 402 includes a snippet library 410 that stores sample client code snippets (e.g., snippets 406-1, 406-2, . . . , 406-O) and/or control or master code snippets (e.g., snippets 408-1, 408-2, . . . , 408-P) according to some embodiments. As described above, client users (e.g., users 404-1, 404-2, . . . , 404-N) develop and/or upload (or send) snippets to a PDN server which configures a group of programmable content delivery nodes (in the network 100) to respond to dynamic network requests and/or cacheable requests. In some embodiments, the snippet store 402 further includes a snippet publishing module 412 that receives, from the client users, code snippets (sometimes called the client code snippets or the client code snippets) and catalogs (or organizes) the snippet in the snippet library 410. In some embodiments, the snippet publishing module 412 uses metadata uploaded by the client users in performing the organization. In some embodiments, the code snippets are organized as master or control code snippets and/or client code snippets for easy navigation. In some embodiments, the client code snippets and/or master code snippets are labelled by the snippet publishing module 412 to easily identify snippet types. In some embodiments, the snippet store 402 includes a snippet search and retrieval module 414. The module 414 receives input from an client user (e.g., the user 404-2 provides input via the device 292-2) to select and/or a retrieve a subset of the snippets in the snippet library 410. In some embodiments, the module 414 provides narrowing and/or expanding options (e.g., as affordances) to specify the scope of search. In some embodiments, the snippet store 402 includes a snippet Integrated Development Environment (IDE) module 416 to help developers (client users) to develop, test, and/or launch snippets. Some embodiments provide testbeds (e.g., test nodes or related resources) to test newly developed code snippets before launching or uploading the snippets to the PDN server 200. In some embodiments, the module 416 includes one or more graphical user interfaces (e.g., visual code editors, debuggers, loaders) to provide developers with tools to develop and/or upload snippet programs. Although not shown, in some embodiments, the snippets are password-protected or secured so that only developers with access privileges (e.g., from an enterprise client or a company) can be authorized to view and/or share the snippets, and other developers (e.g., users of a different enterprise client or company) are excluded from accessing the snippets. In some embodiments, the code snippets include templates that include placeholders (e.g., for specifying origin servers, network configuration parameters, network latencies) for front-end developers to begin developing code snippets. Thus, the snippet store 402 provides an easy and convenient interface to develop and share code snippets to program content delivery networks for network-centric applications, according to some embodiments.

In another aspect, a method of provisioning snippets for programming a content delivery network is provided. The method includes receiving, by a system (e.g., the snippet store 402 described above in reference to FIGS. 4A and 4B) comprising a processor, a first client code snippet (e.g., the snippet 406-1 or the snippet 408-1) from a first client (e.g., the user 404-1 or a device used by that user). The first client code snippet includes at least one of (i) identity information of one or more origin servers, (ii) standard responses for one or more network requests, and (iii) configuration parameters to configure the content delivery network to respond to the one or more network requests. For example, the client code snippet includes (ii) standard responses, and a master code snippet includes (ii) configuration parameters, according to some embodiments. In response to receiving the first client code snippet, the method includes publishing, by the system (e.g., by the snippet publishing module 412), the first client code snippet to a snippet library (e.g., the library 410), and indexing, by the system, the first client code snippet in the snippet library based on one or more metadata (not shown; e.g., a class of the snippet, such as an e-Commerce client code snippet) included in the first client code snippet. In some embodiments, the snippet library resides on a cloud platform (e.g., an Amazon Drive, or Dropbox). In some embodiments, the snippet library classifies the first client code snippet according to predetermined hierarchical categories (e.g., categories specified by one or more enterprise clients; e.g., as client code snippets and master code snippets, as shown in FIG. 4B). The method also includes receiving, by the system, from a second client (e.g., the user 404-2), a request for a second client code snippet. In response to receiving the request for the second client code snippet, the method includes selecting, by the system (e.g., by the snippet search and retrieval module 414), a subset of client code snippets stored in the snippet library. The method further includes rendering, by the system, identification information for the subset of client code snippets, and outputting, by the system, a selected client code snippet from the subset of client code snippets.

In some embodiments, the method further includes, prior to publishing the first client code snippet to the snippet library, verifying, by the system, access privileges of the first client to access the snippet library. In some embodiments, the method further includes, prior to selecting the subset of client code snippets stored in the snippet library, verifying, by the system, access privileges of the second client to access the snippet library.

In some embodiments, the content delivery nodes includes a subset of programmable nodes to configure to respond to the one or more network requests, and the method further includes, prior to publishing the first client code snippet to the snippet library, validating, by the system, the first client code snippet for responses to the one or more network requests using the subset of nodes.

In the descriptions above, an article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory computer-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first client code snippet could be termed a second client code snippet, and, similarly, a second client code snippet could be termed a first client code snippet, without changing the meaning of the description, so long as all occurrences of the "first client code snippet" are renamed consistently and all occurrences of the "second client code snippet" are renamed consistently. The first client code snippet and the second client code snippet are both client code snippets, but they are not the same client code snippet.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A method of provisioning code snippets for programming a content delivery network, the method comprising:
   receiving, by a system comprising a processor, a first client code snippet from a first client, wherein the first client code snippet includes at least one of (i) identity information of one or more origin servers, (ii) standard responses for one or more network requests, and (iii) configuration parameters to configure programmable content delivery nodes of a content delivery network to respond to the one or more network requests;

in response to receiving the first client code snippet:
  publishing, by the system, the first client code snippet to a snippet library, wherein the snippet library resides on a cloud platform; and
  indexing, by the system, the first client code snippet in the snippet library based on one or more metadata included in the first client code snippet; and
receiving, by the system, from a second client, a request for a second client code snippet;
in response to receiving the request for the second client code snippet, selecting, by the system, a subset of client code snippets stored in the snippet library;
rendering, by the system, identification information for the subset of client code snippets; and
outputting, by the system, a selected client code snippet from the subset of client code snippets.

2. The method of claim 1, further comprising:
prior to publishing the first client code snippet to the snippet library, verifying, by the system, access privileges of the first client to access the snippet library.

3. The method of claim 1, further comprising:
prior to selecting the subset of client code snippets stored in the snippet library, verifying, by the system, access privileges of the second client to access the snippet library.

4. The method of claim 1, wherein the content delivery network includes programmable content delivery nodes to configure to respond to the one or more network requests.

5. The method of claim 1, further comprising:
prior to publishing the first client code snippet to the snippet library, validating, by the system, the first client code snippet for responses to the one or more network requests using an isolated subset of the programmable content delivery nodes of the content delivery network.

6. The method of claim 5, wherein validating the first client code snippet comprises:
determining if the first client code snippet meets a predetermined safety threshold by executing and monitoring the first client code snippet on the isolated subset of the programmable content delivery nodes, the isolated subset of the programmable content delivery nodes not sharing resources with other programmable content delivery nodes and not executing any client code snippet other than the first client code snippet.

7. The method of claim 6, further comprising:
in accordance with a determination that the first client code snippet meets the predetermined safety threshold, configuring a first subset of the programmable content delivery nodes in a plurality of stages, each stage including a distinct subset of the first subset of the programmable content delivery nodes, and each subsequent stage including an increasing number of programmable content delivery nodes.

8. The method of claim 1, wherein the one or more metadata includes a class of the first client code snippet.

9. The method of claim 8, wherein the class includes an e-Commerce client code snippet.

10. The method of claim 1, wherein the snippet library classifies the first client code snippet according to predetermined hierarchical categories.

11. The method of claim 10, wherein the predetermined hierarchical categories include categories specified by one or more enterprise clients.

12. The method of claim 10, wherein the predetermined hierarchical categories include (i) client code snippets for configuring the content delivery network to respond to the one or more network requests, and (ii) master code snippets for monitoring execution of the client code snippets.

13. The method of claim 1, wherein the snippet library includes pre-loaded templates for developing client code snippets or samples of client code snippets.

14. The method of claim 1, wherein the snippet library stores client code snippets written in a plurality of plurality programming languages.

15. An electronic device, comprising:
one or more processors; and
memory storing one or more programs for execution by the one or more processors, the one or more programs including instructions for:
  receiving, by a system comprising a processor, a first client code snippet from a first client, wherein the first client code snippet includes at least one of (i) identity information of one or more origin servers, (ii) standard responses for one or more network requests, and (iii) configuration parameters to configure the content delivery network to respond to the one or more network requests;
  in response to receiving the first client code snippet:
    publishing, by the system, the first client code snippet to a snippet library, wherein the snippet library resides on a cloud platform; and
    indexing, by the system, the first client code snippet in the snippet library based on one or more metadata included in the first client code snippet, wherein the snippet library classifies the first client code snippet according to predetermined hierarchical categories;
  receiving, by the system, from a second client, a request for a second client code snippet;
  in response to receiving the request for the second client code snippet, selecting, by the system, a subset of client code snippets stored in the snippet library;
  rendering, by the system, identification information for the subset of client code snippets; and
  outputting, by the system, a selected client code snippet from the subset of client code snippets.

16. The electronic device of claim 15, wherein the one or more programs further include instructions for:
prior to publishing the first client code snippet to the snippet library, verifying, by the electronic device, access privileges of the first client to access the snippet library.

17. The electronic device of claim 15, wherein the one or more programs further include instructions for:
prior to selecting the subset of client code snippets stored in the snippet library, verifying, by the electronic device, access privileges of the second client to access the snippet library.

18. The electronic device of claim 15, wherein the content delivery network includes programmable content delivery nodes to configure to respond to the one or more network requests.

19. The electronic device of claim 15, wherein the one or more programs further include instructions for:
prior to publishing the first client code snippet to the snippet library, validating, by the electronic device, the first client code snippet for responses to the one or more network requests using an isolated subset of programmable content delivery nodes of the content delivery network.

20. A non-transitory computer-readable storage medium storing one or more programs for execution by one or more processors of an electronic device, the one or more programs including instructions for:
- receiving, by a system comprising a processor, a first client code snippet from a first client, wherein the first client code snippet includes at least one of (i) identity information of one or more origin servers, (ii) standard responses for one or more network requests, and (iii) configuration parameters to configure the content delivery network to respond to the one or more network requests;
- in response to receiving the first client code snippet:
  - publishing, by the system, the first client code snippet to a snippet library, wherein the snippet library resides on a cloud platform; and
  - indexing, by the system, the first client code snippet in the snippet library based on one or more metadata included in the first client code snippet, wherein the snippet library classifies the first client code snippet according to predetermined hierarchical categories;
- receiving, by the system, from a second client, a request for a second client code snippet;
- in response to receiving the request for the second client code snippet, selecting, by the system, a subset of client code snippets stored in the snippet library;
- rendering, by the system, identification information for the subset of client code snippets; and
- outputting, by the system, a selected client code snippet from the subset of client code snippets.

* * * * *

UNITED STATES PATENT AND TRADEMARK OFFICE
CERTIFICATE OF CORRECTION

| | | |
|---|---|---|
| PATENT NO. | : 11,553,060 B2 | Page 1 of 1 |
| APPLICATION NO. | : 17/192593 | |
| DATED | : January 10, 2023 | |
| INVENTOR(S) | : Subramanian Varadarajan, Rosarin Jolly Roy Antonyraj and Kumaravel Senthivel | |

It is certified that error appears in the above-identified patent and that said Letters Patent is hereby corrected as shown below:

On the Title Page

Item (72), should read:
--Inventors: Subramanian Varadarajan, Los Gatos, CA (US); Rosarin Jolly Roy Antonyraj, Sunnyvale, CA (US); Kumaravel Senthivel, San Jose, CA (US)--

Signed and Sealed this
Eleventh Day of June, 2024

Katherine Kelly Vidal
*Director of the United States Patent and Trademark Office*